(12) United States Patent
Hunter

(10) Patent No.: US 6,964,562 B2
(45) Date of Patent: *Nov. 15, 2005

(54) EXTRUDER DIE AND CUTTER ASSEMBLY FOR EXTRUDING FILLED FOOD PIECES

(75) Inventor: Thomas B. Hunter, Collinsville, IL (US)

(73) Assignee: Kerry, Inc., Beloit, WI (US)

(*) Notice: Subject to any disclaimer, the term of this patent is extended or adjusted under 35 U.S.C. 154(b) by 212 days.

This patent is subject to a terminal disclaimer.

(21) Appl. No.: 10/330,070

(22) Filed: Dec. 30, 2002

(65) Prior Publication Data
US 2003/0228387 A1 Dec. 11, 2003

Related U.S. Application Data
(60) Provisional application No. 60/387,445, filed on Jun. 11, 2002.

(51) Int. Cl.⁷ .............................................. A21C 11/10
(52) U.S. Cl. .................... 425/133.1; 425/191; 425/311; 425/461
(58) Field of Search ................................. 425/190, 191, 425/131.1, 133.1, 311, 461, 308; 426/513, 516, 518

(56) References Cited

U.S. PATENT DOCUMENTS

| | | | |
|---|---|---|---|
| 498,142 A | 5/1893 | Thoens | 425/131.1 |
| 936,722 A | 10/1909 | Howard | 425/133.1 |
| 2,042,940 A | 6/1936 | Herron | 426/284 |
| 2,125,729 A | 8/1938 | Kretchmer | 425/133.1 |
| 2,568,491 A | 9/1951 | Edwards | 425/133.1 |
| 2,982,231 A | 5/1961 | Fries | 425/131.1 |
| 3,314,381 A | 4/1967 | Fries et al. | 425/131.1 |
| 3,362,355 A | 1/1968 | Roth | 426/439 |
| 3,541,946 A | 11/1970 | Johnston | 425/133.1 |
| 3,764,715 A | 10/1973 | Henthorn et al. | 426/273 |

(Continued)

Primary Examiner—Joseph S. Del Sole
(74) Attorney, Agent, or Firm—Birch, Stewart, Kolasch & Birch, LLP

(57) ABSTRACT

A die and cutter assembly for an extruder includes an elongated extrusion member having a first, open end and a second, closed end. The first, open end is attachable in fluid communication with a first manifold of the extruder, and the second, closed end is formed by a removable extrusion end cap. An extension is formed on the elongated extrusion member. A filling passageway is formed in a wall of the elongated extrusion member, which is attachable to a second manifold of the extruder. A first filling passageway extension is in communication with and removably mounted to the filling passageway. The first filling passageway extension generally transverse to the filling passageway and extends into the extension of the elongated extrusion member. An extrusion die is formed on the extension of the elongated extrusion member. A cutter member has an opened drivable end, an elongated cutter wall, and an opened cutter end with a cutting surface for cutting extrudate to a desired length as the extrudate exits the die. The cutter member is disposed at least partially over and reciprocally slideable on the extrusion wall and operably connectable at the drivable end to a drive device of the extruder for reciprocatably sliding the cutting surface of the cutter member over and away from the extrusion die.

16 Claims, 10 Drawing Sheets

U.S. PATENT DOCUMENTS

| | | | |
|---|---|---|---|
| 3,806,290 A | 4/1974 | Graff et al. | 425/133.1 |
| 3,807,919 A | 4/1974 | Kaufman, Jr. et al. | 425/133.1 |
| 3,860,373 A | 1/1975 | Kaufman et al. | 425/155 |
| 3,947,178 A | 3/1976 | Belshaw et al. | 425/132 |
| 3,969,994 A | 7/1976 | Kaneko et al. | 99/450.6 |
| 4,015,518 A | 4/1977 | Roth et al. | 99/450.6 |
| 4,025,260 A | 5/1977 | Neel | 425/131.1 |
| 4,251,201 A | 2/1981 | Krysiak | 425/132 |
| 4,259,051 A | 3/1981 | Shatila | 425/133.1 |
| 4,469,475 A | 9/1984 | Krysiak | 425/132 |
| 4,579,744 A | 4/1986 | Thulin et al. | 426/283 |
| 4,648,821 A | 3/1987 | Thulin | 425/133.1 |
| 4,659,580 A | 4/1987 | Svengren | 426/516 |
| 4,698,000 A | 10/1987 | Thulin et al. | 425/133.1 |
| 4,793,786 A | 12/1988 | Greenhouse et al. | 425/131.1 |
| 4,855,146 A | 8/1989 | Murakami et al. | 426/5 |
| 4,859,165 A | 8/1989 | Hoashi | 425/133.1 |
| 4,882,185 A | 11/1989 | Simelunas et al. | 426/283 |
| 5,449,281 A | 9/1995 | Dupart et al. | 425/131.1 |
| 5,492,706 A | 2/1996 | Cockings et al. | 426/282 |
| 5,773,043 A | 6/1998 | Hunter | 425/311 |
| 5,888,131 A | 3/1999 | Kobussen et al. | 452/30 |
| 5,906,838 A * | 5/1999 | Keehn et al. | 425/131.1 |
| 6,206,678 B1 | 3/2001 | Keehn et al. | 425/308 |
| 6,511,309 B1 | 1/2003 | Hunter | 425/133.1 |

\* cited by examiner

US 6,964,562 B2

EXTRUDER DIE AND CUTTER ASSEMBLY FOR EXTRUDING FILLED FOOD PIECES

CROSS-REFERENCE TO RELATED APPLICATIONS

This application claims priority under 35 U.S.C. §119 on U.S. Provisional Application No. 60/387,445 filed on Jun. 11, 2002, the entirety of which is hereby incorporated by reference.

BACKGROUND OF THE INVENTION

1. Field of the Invention

The present invention relates to an extruder die and cutter assembly for extruding filled food pieces. More particularly, the present invention relates to an extruder die and cutter assembly, which includes an extension formed on an extrusion member and a filling tube for allowing the extrudate to exit the die and cutter assembly from the side.

2. Description of Background Art

Extruders for producing extruded food pieces are known. Such extruders can conventionally include a pressure vessel for containing, under pressure, a mash of the food to be extruded. Furthermore, pressure exerting means for maintaining pressure in the pressure vessel, a manifold in fluid communication with the pressure vessel, and a die and cutter assembly, generally located underneath the pressure vessel, in fluid communication with the manifold can be included. The extruded food is cut to size by a die and cutter assembly.

Food products that can be extruded in such extruders include, e.g., meats, poultry, seafood, cereal grains, vegetables, fruits, and solid dairy products. As specific examples, the mash may be prepared from beef, chicken, shrimp, wheat, corn, rice, potatoes, apples, and cheese.

The food is ground to a particle size consistent with forming a fluid mash, e.g., particle sizes that will pass through a U.S. Screen Series No. 5 screen, more usually a No. 10 screen, and often a No. 20 screen up to about a No. 100 screen.

Water or other dispersing liquids, e.g., 3% to 70%, may be added to the ground food in order to produce a liquid mash. Binders, flavors, preservatives, colors, stabilizers, antioxidants, and the like may be added to the mash, in conventional amounts. Most often, a gelling material is added to the mash, e.g., a settable gum or pectate, for example, guar gum and sodium alginate, in conventional amounts of about 0.1% to 25%. The gum or pectate is set by a gelling agent, e.g., a 0.5% to 10% solution of calcium chloride and sodium alginate.

The present inventor has also invented an extruder for extruding foodstuff containing a filling. In U.S. application Ser. No. 09/576,766 filed on May 24, 2000, now U.S. Pat. No. 6,511,309 B1, an extruder die and cutter assembly includes an extension formed on the extrusion member and a filling tube to allow for the extrudate to exit the die and cutter assembly from the side. U.S. application Ser. No. 09/576,766, now U.S. Pat. No. 6,511,309 B1, is hereby incorporated by reference. In the above application; however, the filling tube extends through a length of an interior passageway of the extrusion member, making the extrusion member difficult to clean between process runs.

SUMMARY OF THE INVENTION

It is an object of the present invention to provide an extruder die and cutter assembly, which makes up for the above deficiencies of the background art. Specifically, it is an object of the present invention to provide an extruder die and cutter assembly, which includes an extruded product having a filling, and wherein the extruder die and cutter assembly is easily cleaned between process runs.

It is another object of the present invention to provide an extruder die and cutter assembly, which includes an easily replaceable filling passageway extension. The filling passageway extension can be easily removed for cleaning or replaced between process runs. In addition, the filling passageway extension can be formed in different shapes to correspond with a shape of the extrusion passageway of an extrusion die in order to obtain a more consistently formed foodstuff with a filling.

In order to accomplish the above objects of the present invention, a die and cutter assembly for an extruder, comprises:

an elongated extrusion member having a first, open end and a second, closed end, said first, open end being attachable in fluid communication with a first manifold of the extruder, said second, closed end being formed by a removable extrusion end cap;

an extension formed on said elongated extrusion member;

a filling passageway formed in a wall of said elongated extrusion member, said filling passageway being attachable to a second manifold of the extruder;

a first filling passageway extension, said first filing passageway extension being in communication with and removable from said filling passageway, said first filling passageway extension extending generally transverse to said filling passageway and into said extension of said elongated extrusion member;

an extrusion die formed on said extension of said elongated extrusion member; and a cutter member having an opened drivable end, an elongated cutter wall, and an opened cutter end with a cutting surface for cutting extrudate to a desired length as the extrudate exits the die, said cutter member being disposed at least partially over and reciprocally slideable on the extrusion wall and operably connectable at the drivable end to a drive device of the extruder for reciprocatably sliding the cutting surface of the cutter member over and away from the extrusion die.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
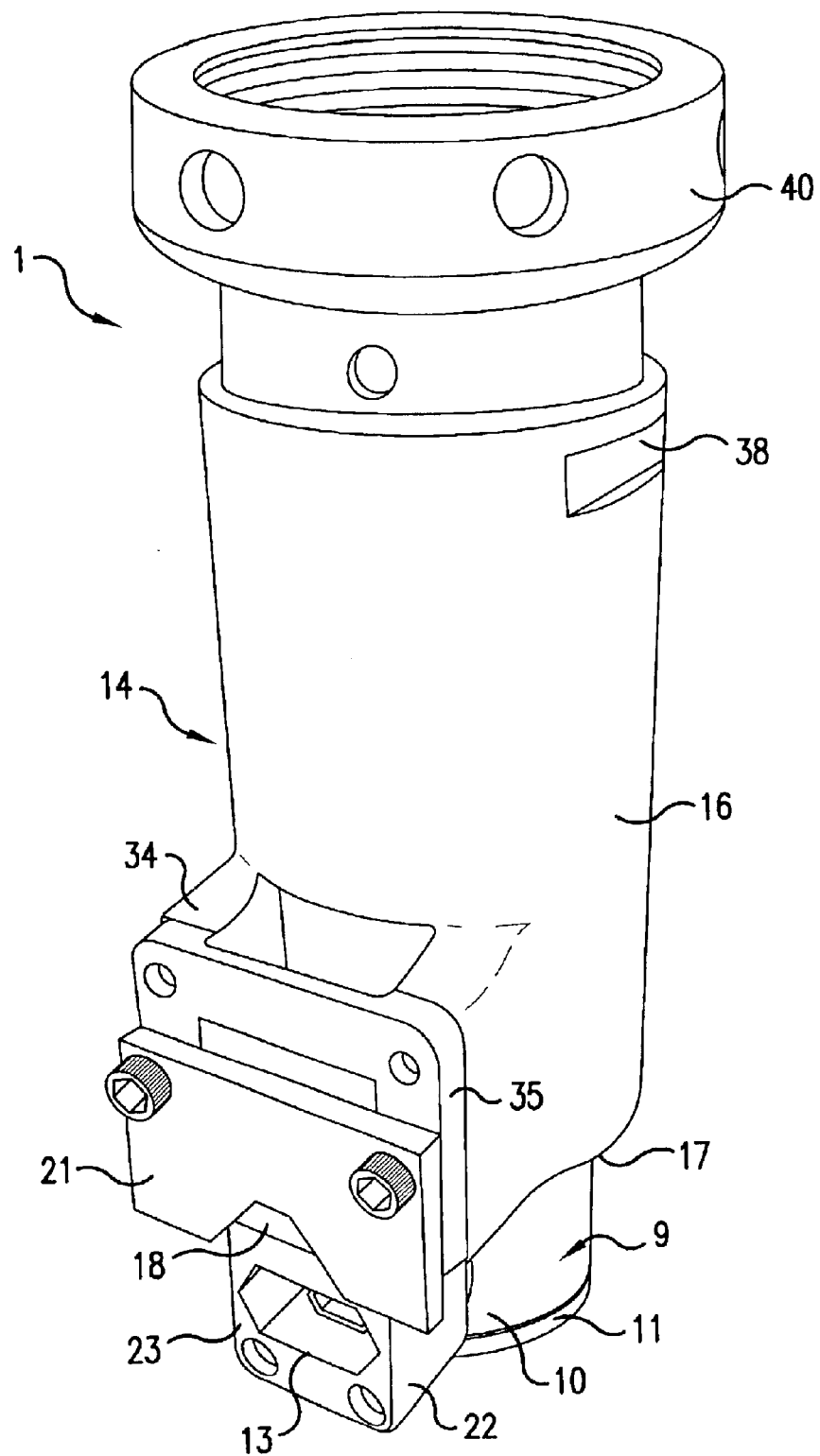
FIG. 1 is a perspective view of the die and cutter assembly of the present invention.

The present invention will now be described with reference to the accompanying drawings in which the same reference numerals have been used to identify the same or similar elements.

Figure 2:
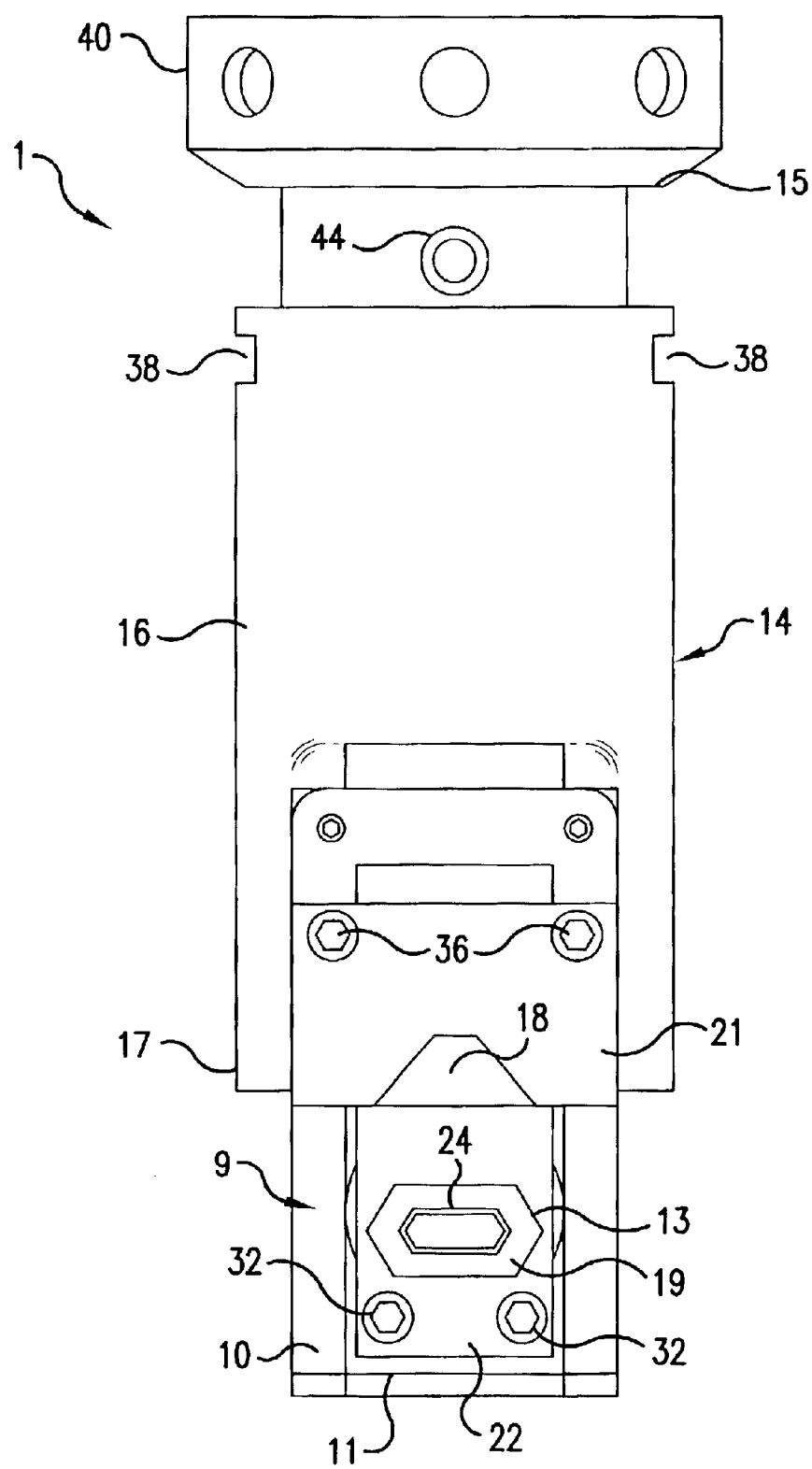
FIG. 2 is a front elevation of the die and cutter assembly of the present invention illustrating the "ready to cut" state.

FIGS. 1 and 2 illustrate the die and cutter assembly of the present invention in the "ready to cut" state. Referring to FIGS. 1–2, the die and cutter assembly of the present invention 1 includes an elongated annular extrusion number 9 having a generally tubular extrusion wall 10. An extrusion end cap 11 is connected to the extrusion wall 10 to close a bottom end of the annular extrusion member 9 and an open feed end 12 (see FIG. 4) is formed adjacent an upper end of the extrusion number 9. The extrusion end cap 11 is attachable to the extrusion wall 10 by, for example, a plurality of screws (not shown). A gasket 47 (see FIG. 9) is located between the extrusion end cap 11 and the extrusion wall 10 in order to ensure that extrudate does not seep through the bottom end of the extrusion member 9. The die and cutter assembly 1 of the present invention is attachable to an extruder, such as the extruder described in U.S. Pat. No. 5,773,043, the entirety of which is hereby incorporated by reference, and will therefore not be described in detail. The open feed end 12 is attachable in fluid communication to a manifold (not shown) by, for example, a threaded flange 40. The manifold is connectable to a pressure vessel (not shown) for containing a mash under pressure by a pressure asserting device (not shown).

Further to this, it is preferable that the die and cutter assembly 1 of the present invention be a 1¾" or a 2" diameter assembly. A 2" diameter assembly would be the maximum diameter supportable by, for example, the above mentioned extruder. However, it should be understood to one having ordinary skill in the art that an assembly of a larger or smaller diameter is within the scope of the present invention. The use of larger diameter assemblies can be accomplished by modifying the extruder itself to provide a larger distance between assemblies. Alternatively, a larger diameter assembly can be accomplished by providing an assembly on every other attachment, with alternating attachments being closed off.

A filling passageway 20 extends through the extrusion wall 10 of the extrusion member 9. The filling passageway 20 is formed by drilling a hole through a thickened portion 40 of the extrusion wall 10 parallel to an axis of the extrusion member 9 along an entire length thereof (see FIGS. 4, 6 and 7). In addition, a hole 41 is drilled in the thickened portion 40 generally perpendicular thereto. The hole 41 is in communication with an axial passage 42 formed in the extrusion member 9 and the filling passageway 20. Furthermore, an additional hole 43 is formed through the extrusion wall 10 opposite to the thickened portion 40. The hole 43 is formed coaxial with the hole 41. A filling passageway extension 44 is attached to the annular extrusion member 9 through the holes 41 and 43 by a set screw 45, for example, which is inserted through hole 49 formed in the extrusion wall 10 (See FIG. 4) and into engagement with the filling passageway extension 44 to secure the filling passageway extension 44 in place. An o-ring 46 can be used to seal between the filling passageway extension 44 and the hole 43 to ensure that filling material does not seep into the axial passage 42 of the annular extrusion member 9. The filling passageway 20 is also in fluid communication with a second manifold (not shown), which is connectable to a second pressure vessel (not shown) for containing a filling under pressure by a second pressure exerting device (not shown) via the filling passageway extension 44.

It is noted that the manifolds are included in the embodiment described above for distributing the mash and the filling to a plurality of die and cutter assemblies. However, if only one die and cutter assembly is to be used, the necessity of the manifolds is eliminated.

The extrusion member 9 includes an extension 22 formed at substantially a right angle to an axis of the extrusion member 9. The extension 22 is mounted to the extrusion member 9 at a side surface thereof by, for example, a plurality of screws 32 which extend through respective holes 30 formed in the extension 22 (see FIGS. 2 and 4). The extension 22 also includes an extrusion die 13 on an end thereof for cooperating with a cutting element 21 of a cutter member as will be described hereinbelow.

Figure 7:
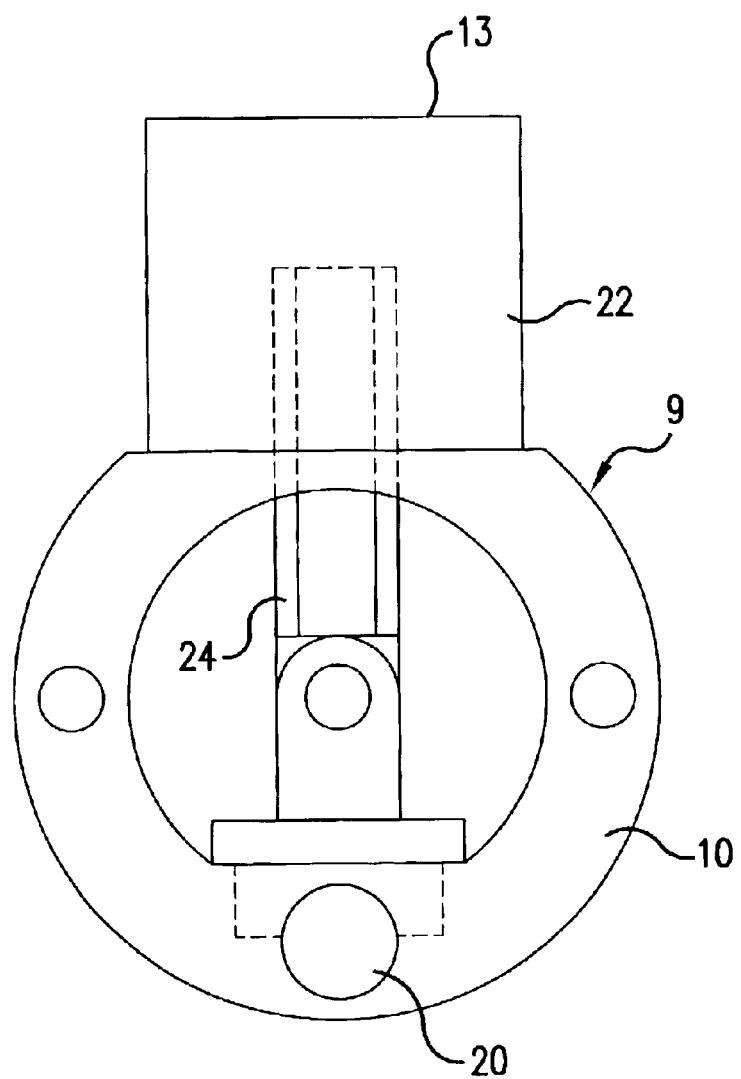
FIG. 7 is a bottom view of the annular extrusion member 9 and the filling passageway extension 24 of the present invention.
Figure 8:
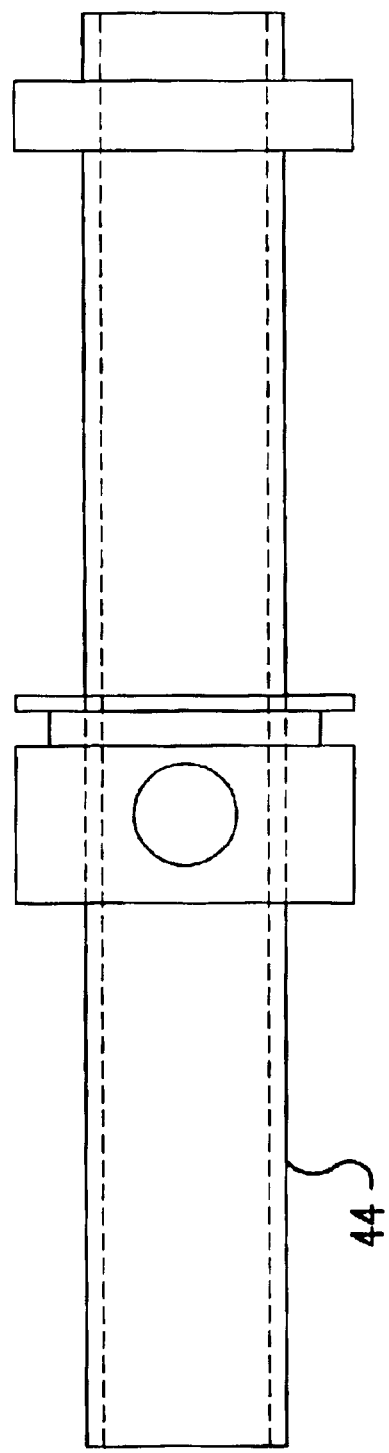
FIG. 8 is a view of the filling passageway extension 44 of the present invention.

Furthermore, a filling passageway extension 24 is attached to the filling passageway 20 at substantially a right angle to the axis of the filling passageway 20. Referring specifically to FIGS. 2 and 7, the filling passageway extension 24 is located generally centrally of the extension 22 of the extension member 9. However, it should be noted that the filling passageway extension 24 can also be located off-center, depending on the application. For example, it is possible to provide the filling passageway extension 24 such that an entirety of a bottom half of the extrusion passageway 19 is filled by the filling passageway 24. In this example, rather than providing a filling through the filling passageway, a second mash can be supplied in order to form a two-layered product.

It should also be understood that the die and cutter assembly of the present invention can also be operated in a reverse manner. Specifically, providing a mash to the filling tube and a sauce or filling to the axial passage 42 can form a very unique food product having a coating on the outside. Of course, in this example, the relative sizes of the filling tube extension 24 and the extrusion passageway 19 may have to be modified in order to obtain a desired product.

Figure 9:
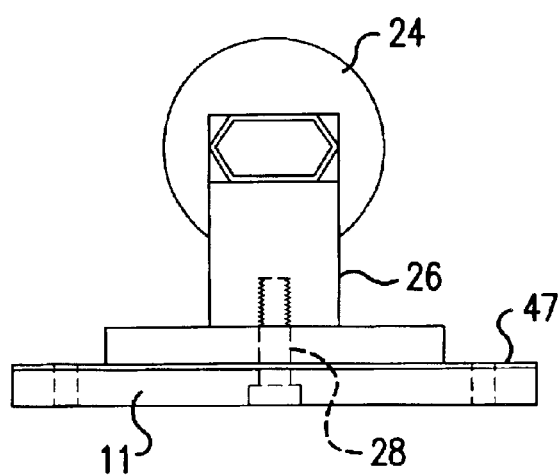
FIG. 9 is a view of the bottom cap 11 and filling passageway extension 24 of the present invention.
Figure 10A:
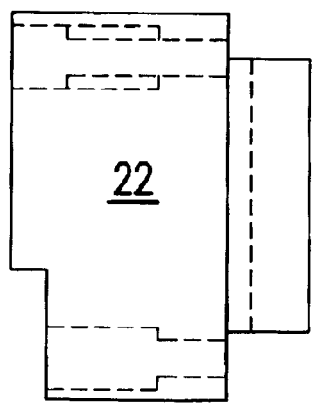
FIGS. 10(A)–10(C) are views of the extension 22 of the present invention.
Figure 10B:
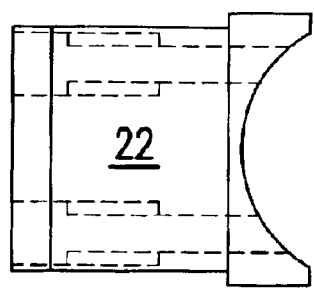
Figure 10C:
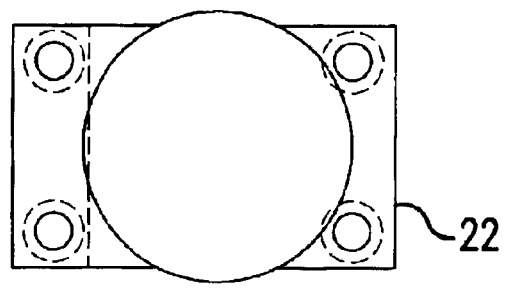

Referring again to FIGS. 2 and 7, the filling passageway extension 24 of the filling passageway 20 extends within an extrusion passageway 19 formed in the extension 22 of the extrusion member 9. Referring to FIG. 9, the filling passageway extension 24 of the filling passageway 20 is mounted to the extrusion end cap 11 of the extrusion member 9 by a support block 26, which is formed integrally with the filling passageway extension 24. The support block 26 is attached to the extrusion end cap 11 by a screw 28, for example. Referring to FIG. 7, the filling passageway extension 24 is supported in communication with the filling passageway 20 by connecting the extrusion end cap 11 to the extrusion wall 10.

The die and cutter assembly 1 of the present invention also includes a cutter member 14 having an open drivable end 15, an elongated cutter wall 16, and an open cutter end 17. The cutter wall 16 includes a housing or extension 34 formed thereon for supporting a cutting element 21. The cutting element 21 includes a cutting surface 18 for cooperating with the extrusion die 13 to cut and crimp extrudate to a desired length as the extrudate exits extrusion die 13. The cutting element 21 is mounted to a face plate 35 mounted on the extension 34 by a plurality of screws 36. The cutting surface 18 of the cutting element 21 is formed at an angle between 25 to 90° to a surface of said cutting element 21. Referring to FIG. 2, the elongated cutter wall 16 includes two cut-out portions 38 formed on an outside surface thereof adjacent the open drivable end 15. The cut-out portions 38 are for receiving the operable end of a drive device (not shown) in order to reciprocate the cutting member 14 and therefore the cutting element 21 up and down in cooperation with the extrusion die 13. The drive device can be any well known device for reciprocating the cutting member 14. It is also possible to provide a groove (not shown) around the outer circumference of the annular extrusion member 9 instead of the cut-out portions 38 as would be understood to one having ordinary skill in the art.

It is noted that the extrusion wall 10 and the cutter member 14 are illustrated having cooperating tubular shapes; however, it can be readily understood to one having ordinary skill in the art that they may be made in other cooperating shapes as well. All that is necessary is for the cutting member 14 to have an inside diameter of generally the same size and shape as the outside diameter and shape of the extrusion wall 10 to allow the cutting member 14 to reciprocate in a sliding manner on the outside of the extrusion wall 10.

Figure 3:
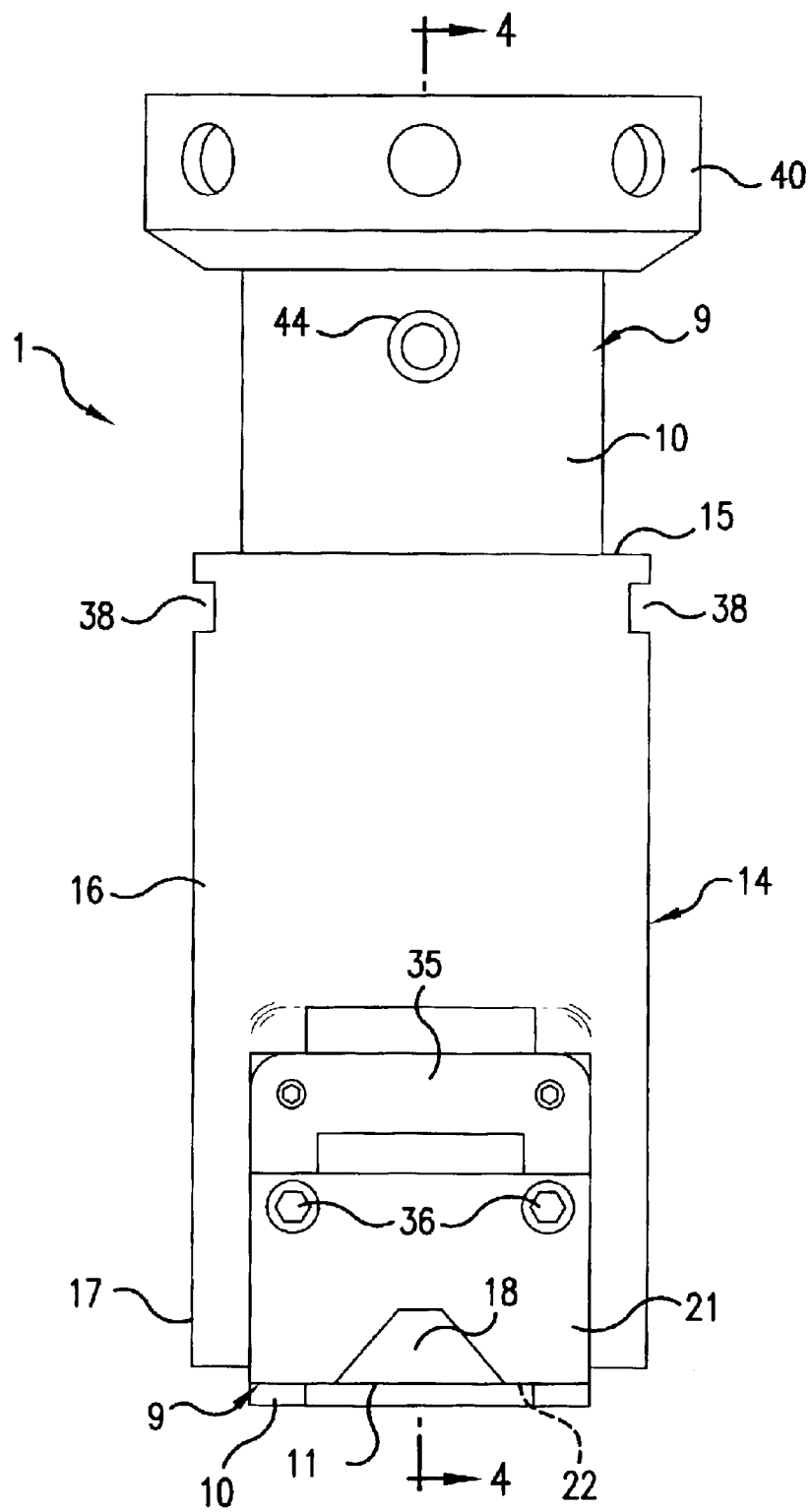
FIG. 3 is a front elevation of the die and cutter assembly of the present invention illustrating the "after cut" state.

The operation of the die and cutter assembly of the present invention will now be described with reference to FIGS. 2 and 3. FIG. 2 illustrates the "ready to cut" state, while FIG. 3 illustrates the "after cut" state. Referring to FIG. 2, the mash is forced through the open fixed end 12 of the extrusion member 9 from the pressure vessel for containing a mash of food while the cutter member 14 is in the upper position. The filling is also forced through the filling passageway extension 44, the filling passageway 20 and the filling passageway extension 24 from the pressure vessel for containing filling. As noted above, if a plurality of die and cutter assemblies are used, the mash and filling are also fed through first and second manifolds, respectively, for distributing the mash and filling to the die and cutter assemblies.

The mash and filling merge together in the extrusion passageway 19 and are forced through the extrusion die 13. Once a predetermined length of extrudate is fed through the extrusion die 13, the cutter member 14 is moved from the position illustrated in FIG. 2 to the position illustrated in FIG. 3 to cut the extrudate to the predetermined length. The movement of the cutter member 14 drives the cutting surface 18 of the cutting element 21 into cooperation with the extrusion die 13 in order to cut the extrudate and crimp the extrudate to ensure that the filling remains within the extruded food product after being cut.

The above operation occurs continuously with the extrudate exiting the extrusion die 13 and being cut by the reciprocating cutting member 14 in order to produce food products of a predetermined length.

It should be noted that the removal of the end cap 11 along with the filling passageway extension 24 allows the filling passageway extension 24 to be removed from the filling passageway 20. This allows for the filling passageway extension 24 to be replaced with a filling passageway 24 having a passageway of a different shape. This allows the possibility of matching the shape of the passageway in the filling passageway extension 24 with the extrusion passageway 19 formed in the extension 22. This provides the advantage of increasing the consistency in the shape of the resulting extruded food product. The possibility of removing the extrusion end cap 11 and filling passageway extension 24 also allows for easy cleaning of the die and cutter assembly 1.

It should also be noted that the provision of the filling passageway 20 being formed in the extrusion wall 10 also eliminates the necessity of providing a filling tube down the axial passage 42 of the annular extrusion member 9. This also provides the advantage of easy cleaning of the die and cutter assembly 1 of the present invention in order to prevent the contamination of the assembly.

Figure 4:
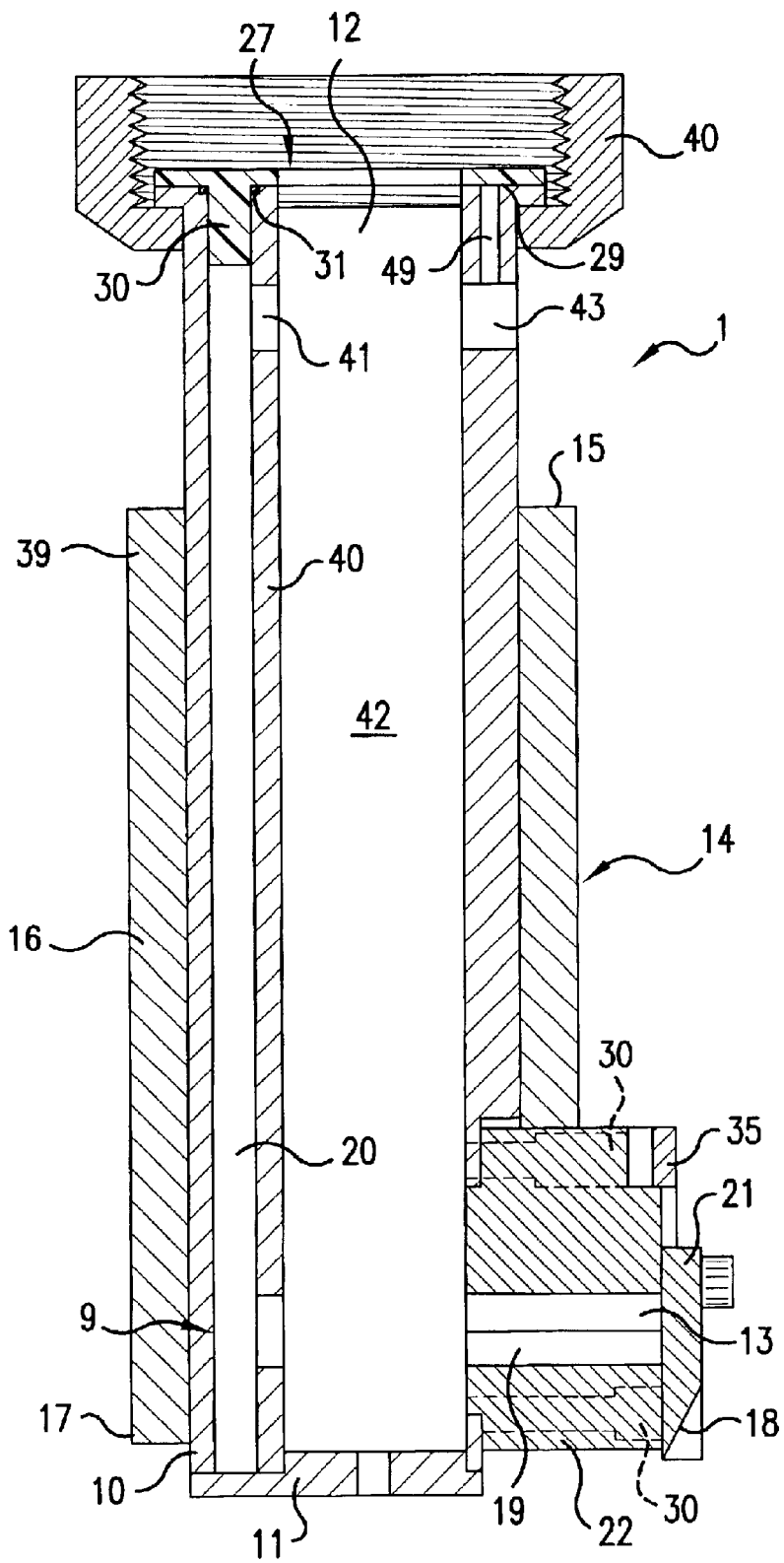
FIG. 4 is a cross-section of the die and cutter assembly of the present invention along line 4—4 of FIG. 3 with the filling passageway extensions 24 and 44 removed for clarity.
Figure 5:
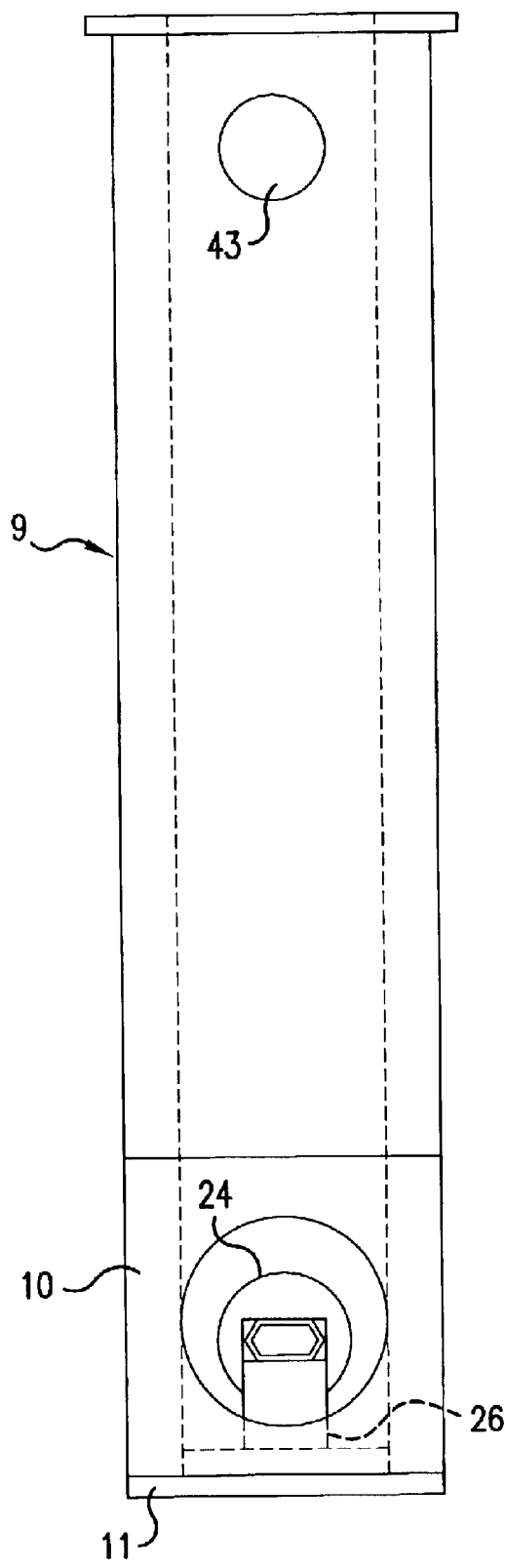
FIG. 5 is a front elevation of the annular extrusion member 9 of the present invention.
Figure 6:
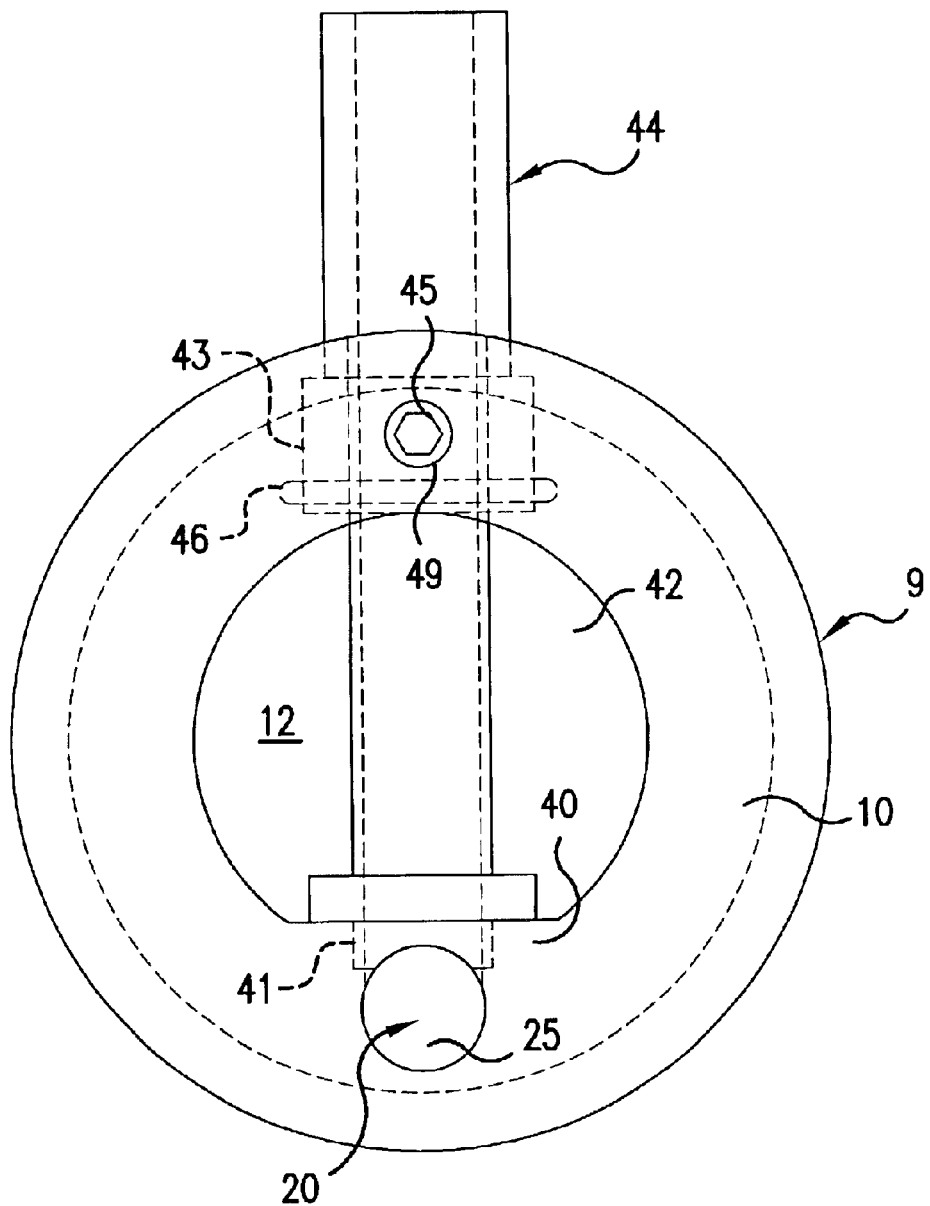
FIG. 6 is a top view of the annular extrusion member 9 and filling passageway extension 44 of the present invention.

Referring to FIGS. 4 and 6, the filling passageway 20 includes an upper portion 25, which extends through the extrusion wall 10 above the hole 41. The upper portion 25 opens at an upper end of the extrusion member 9. During operation of the die and cutter assembly 1, the upper portion 25 is closed by a sealing member 27 (See FIG. 4). The sealing member 27 includes an annular base 29 and a projection 30. The projection 30 includes an o-ring 31 thereon for sealing the upper portion 25 of the filling passageway 20 to ensure that the filling material does not seep into the axial passage 42 of the annular extrusion member 9.

However, for cleaning of the die and cutter assembly 1 between process runs, the sealing member 27 can be removed to unseal the upper portion 25 of the filling passageway 20. Accordingly, the filling passageway 20 can be easily cleaned by a cleaning solution or steam supplied through the upper portion 25.

The cutter member 14 is disposed at least partially over and reciprocally slideable on the tubular extrusion wall and is operably connected at the drivable end to a drive device for reciprocatably sliding the cutter member over and away from the extrusion die 13. The rate of number of strokes per minute (down and up) at which the cutter member can operate can range from 80 strokes/minute through 500 strokes/minute.

The pressure in the pressure vessel will vary considerably from mash to mash and die to die, but pressures of 1 to 250 psig are normally used, especially with the usual mash temperatures of 25° F. to 75° F. Water or other dispersing liquids, e.g., 3% to 70%, may be added to the ground food in order to produce a liquid mash. Binders, flavors, preservatives, colors, stabilizers, antioxidants, and the like may be added to the mash, in conventional amounts. Most often, a gelling material is added to the mash, e.g., a settable gum or pectate, for example, guar gum and sodium alginate, in conventional amounts of about 0.1% to 25%. The gum or pectate is set by a gelling agent, e.g., a 0.5% to 10% solution of calcium chloride and sodium alginate.

The length of individual products extruded in accordance with the present invention will depend upon both the rate at which the cutter member operates and the rate at which the product is extruded, the latter being a function of the viscosity of the product in the pressure vessel and the pressure being applied to that product.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A die and cutter assembly for an extruder for producing an extruded food piece containing a filling, the extruder including a first pressure vessel for containing a mash of the food under pressure, a second pressure vessel for containing the filling under pressure, a pressure exerting device for maintaining pressure in the pressure vessels, and first and second manifolds in fluid communication with the first and second pressure vessels, respectively, said die and cutter assembly being attachable in fluid communication with the first and second manifolds, and comprising:

an elongated extrusion member, said elongated extrusion member including a tubular extrusion wall;

an extrusion end cap, said extrusion end cap being removably attached to one end of said tubular extrusion wall;

an opened feed end formed on a second, opposite end of said elongated extrusion member, said opened feed end being attachable in fluid communication with the first manifold of the extruder;

a filling passageway formed in said tubular extrusion wall, said filling passageway being attachable to the second manifold of the extruder;

an extension formed on said elongated extrusion member;

a first filling passageway extension, said first filing passageway extension being in communication with and removably mounted to said filling passageway, said first filling passageway extension extending generally transverse to said filling passageway and into said extension of said elongated extrusion member;

an extrusion die formed on said extension of said elongated extrusion member; and a cutter member having an opened drivable end, an elongated cutter wall, and an opened cutter end with a cutting surface for cutting extrudate to a desired length as the extrudate exits the die, said cutter member being disposed at least partially over and reciprocally slideable on the extrusion wall and operably connectable at the drivable end to a drive device of the extruder for reciprocatably sliding the cutting surface of the cutter member over and away from the extrusion die.

2. The die and cutter assembly according to claim 1, wherein said first filling passageway extension is attached to an inside surface of said extrusion end cap and is removable therewith from said tubular extrusion wall.

3. The die and cutter assembly according to claim 1, wherein said cutter member includes a housing extending from an outside surface of said elongated cutter wall, said cutting surface being located on said housing in cooperative relationship with said extrusion die.

4. The die and cutter assembly according to claim 3, wherein said cutting surface is formed on a cutting element mounted to said housing, said cutting surface is formed at an angle to a surface of said extrusion die.

5. The die and cutter assembly according to claim 4, wherein said angle is between 25 and 90° with respect to said surface of said extrusion die.

6. The die and cutter assembly according to claim 1, wherein said filling passageway includes a second filling passageway extension attached to an end of said filling passageway opposite said first filling passageway extension, said second filling passageway extension extending transverse to an axis of said filling passageway and being connectable to the second pressure vessel for containing filling under pressure.

7. The die and cutter assembly according to claim 1, wherein said cutter member is tubular and said elongated cutter wall includes an inside diameter generally the same diameter as an outside diameter of said extrusion wall, said cutter member being slidable on said extrusion wall to reciprocate said cutting surface in cooperation with said extrusion die.

8. The die and cutter assembly according to claim 1, wherein said tubular extrusion wall includes a thickened portion extending generally parallel to an axis of said elongated extrusion member, said filling passageway being formed by a hole drilled through the thickened portion and extending parallel to the axis of said elongated extrusion member.

9. A die and cutter assembly for an extruder, comprising:

an elongated extrusion member having a first, open end and a second, closed end, said first, open end being attachable in fluid communication with a first manifold of the extruder, said second, closed end being formed by a removable extrusion end cap;

an extension formed on said elongated extrusion member;

a filling passageway formed in a wall of said elongated extrusion member, said filling passageway being attachable to a second manifold of the extruder;

a first filling passageway extension, said first filing passageway extension being in communication with and removably mounted to said filling passageway, said first filling passageway extension extending generally transverse to said filling passageway and into said extension of said elongated extrusion member;

an extrusion die formed on said extension of said elongated extrusion member; and a cutter member having an opened drivable end, an elongated cutter wall, and an opened cutter end with a cutting surface for cutting extrudate to a desired length as the extrudate exits the die, said cutter member being disposed at least partially over and reciprocally slideable on the extrusion wall and operably connectable at the drivable end to a drive device of the extruder for reciprocatably sliding the cutting surface of the cutter member over and away from the extrusion die.

10. The die and cutter assembly according to claim 9, wherein said first filling passageway extension is attached to an inside surface of said extrusion end cap and is removable therewith from said tubular extrusion wall.

11. The die and cutter assembly according to claim 9, wherein said cutter member includes a housing extending from an outside surface of said elongated cutter wall, said cutting surface being located on said housing in cooperative relationship with said extrusion die.

12. The die and cutter assembly according to claim 11, wherein said cutting surface is formed on a cutting element mounted to said housing, said cutting surface is formed at an angle to a surface of said extrusion die.

13. The die and cutter assembly according to claim 12, wherein said angle is between 25 and 90° with respect to said surface of said housing.

14. The die and cutter assembly according to claim 9, wherein said filling passageway includes a second filling passageway extension formed on an end of said filling passageway opposite said first filling passageway extension, said second filling passageway extension extending transverse to an axis of said filling passageway.

15. The die and cutter assembly according to claim 9, wherein said cutter member is tubular and said elongated cutter wall includes an inside diameter generally the same diameter as an outside diameter of said extrusion wall, said cutter member being slidable on said extrusion wall to reciprocate said cutting surface in cooperation with said extrusion die.

16. The die and cutter assembly according to claim 9, wherein the wall of the elongated extrusion member includes a thickened portion extending generally parallel to an axis of said elongated extrusion member, said filling passageway being formed by a hole drilled through the thickened portion and extending parallel to the axis of said elongated extrusion member.

* * * * *